(12) United States Patent
Garvik et al.

(10) Patent No.: US 9,972,219 B2
(45) Date of Patent: May 15, 2018

(54) POSTPARTUM UTERUS MODEL

(71) Applicant: Laerdal Global Health AS, Stavanger (NO)

(72) Inventors: Tor Inge Garvik, Stavanger (NO); Paulina Quinonez, Stavanger (NO)

(73) Assignee: Laerdal Global Health AS, Stavanger (NO)

( * ) Notice: Subject to any disclaimer, the term of this patent is extended or adjusted under 35 U.S.C. 154(b) by 672 days.

(21) Appl. No.: 14/397,533

(22) PCT Filed: Apr. 29, 2013

(86) PCT No.: PCT/NO2013/050077
§ 371 (c)(1),
(2) Date: Oct. 28, 2014

(87) PCT Pub. No.: WO2013/165256
PCT Pub. Date: Nov. 7, 2013

(65) Prior Publication Data
US 2015/0132733 A1    May 14, 2015

(30) Foreign Application Priority Data
Apr. 30, 2012 (NO) .................................. 20120501

(51) Int. Cl.
*G09B 23/32* (2006.01)
*G09B 23/28* (2006.01)
(52) U.S. Cl.
CPC ......... *G09B 23/285* (2013.01); *G09B 23/281* (2013.01)
(58) Field of Classification Search
CPC ............................ G09B 23/281; G09B 23/285
(Continued)

(56) References Cited

U.S. PATENT DOCUMENTS 3,921,311 A * 11/1975 Beasley ............... G09B 23/281
434/273
5,472,345 A * 12/1995 Eggert ................. G09B 23/281
434/273
(Continued)

FOREIGN PATENT DOCUMENTS

CN        101026989 A     8/2007
CN        202523293 U    11/2012
(Continued)

OTHER PUBLICATIONS

Lomås, Trond, "International Search Report," prepared for PCT/NO2013/050077, dated Jul. 26, 2013, three pages.

*Primary Examiner* — Sam Yao
*Assistant Examiner* — Jennifer L Korb
(74) *Attorney, Agent, or Firm* — Winstead PC

(57) ABSTRACT

The invention provides a simulator for training of personnel for immediate postpartum medical treatment, distinctive in that the simulator comprises a representation of an immediate postpartum stage uterus, a cervix, a vagina and a resilience member, the uterus is arranged at an angle to the vagina and the resilience member is arranged for allowing said angle to be straightened out by pressing horizontally forward on the uterus. The invention also provides a simulator for training of personnel for immediate postpartum medical treatment, distinctive in that the simulator comprises a representation of an immediate postpartum stage uterus, a cervix and a vagina, the uterus comprises a transparent top or intermediate layer allowing visual observation, and preferably a removable or foldable non-transparent top layer over the transparent layer.

12 Claims, 5 Drawing Sheets

Figure 1:
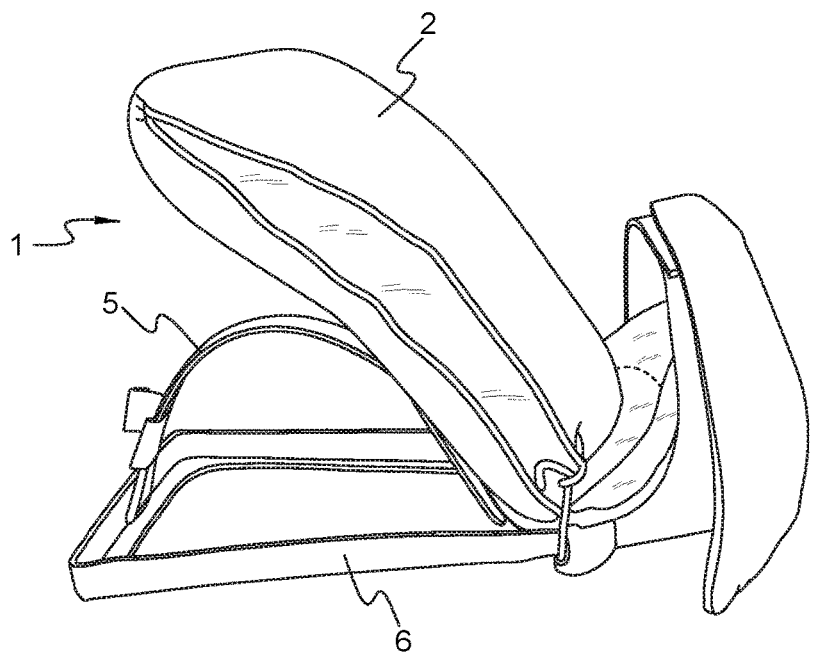

(58) Field of Classification Search
USPC .......................................................... 434/273
See application file for complete search history.

(56) References Cited

U.S. PATENT DOCUMENTS

2002/0193670 A1  12/2002  Garfield et al.
2005/0208026 A1   9/2005  Atala et al.

FOREIGN PATENT DOCUMENTS

| WO | WO-9849942 A1 | 11/1998 | |
|----|---------------|---------|---|
| WO | WO-02096288 A1 | 12/2002 | |
| WO | WO 2011073407 A1 * | 6/2011 | ........... G09B 23/281 |
| WO | WO-2011073407 A1 | 6/2011 | |

* cited by examiner

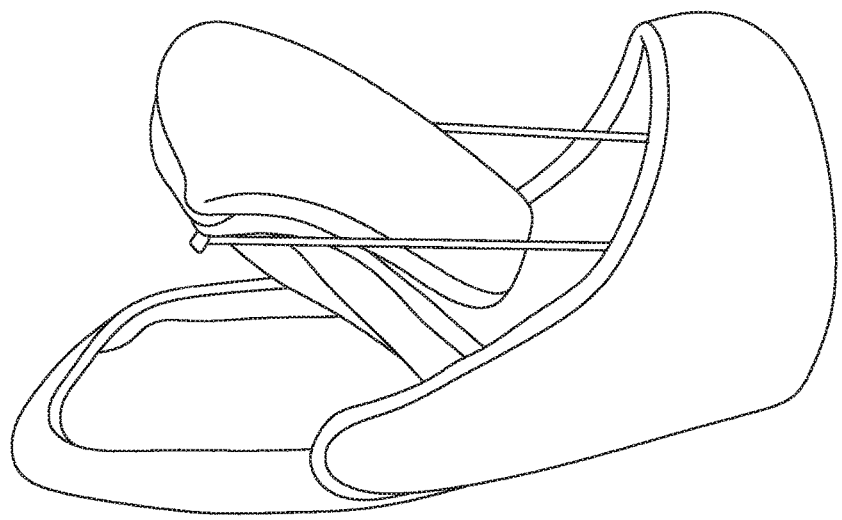
FIG. 6 Normal position
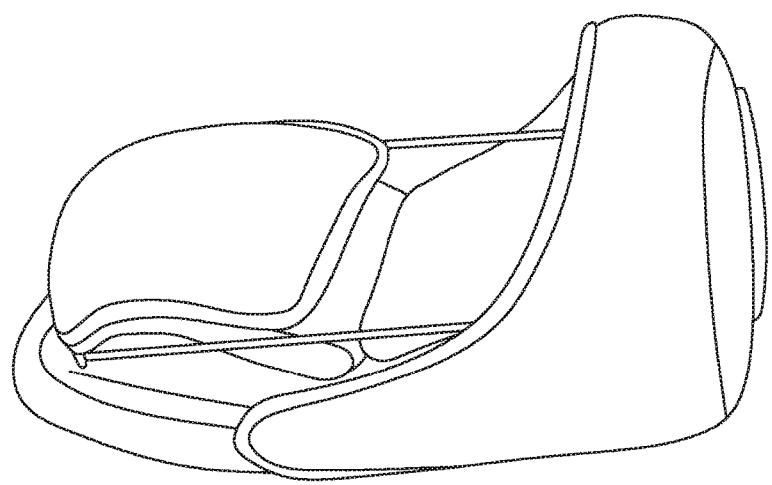
FIG. 7 Uterus pushed down

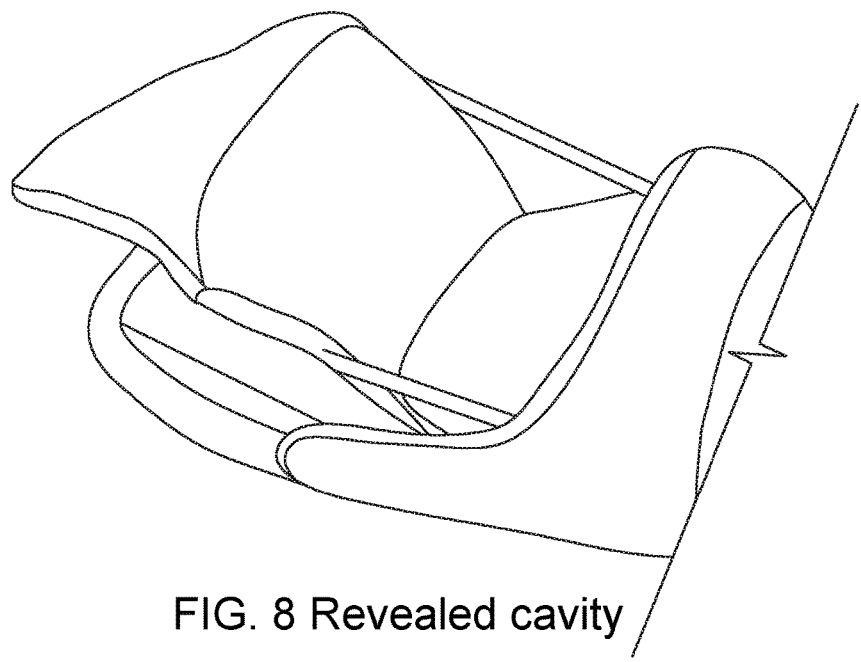
FIG. 8 Revealed cavity
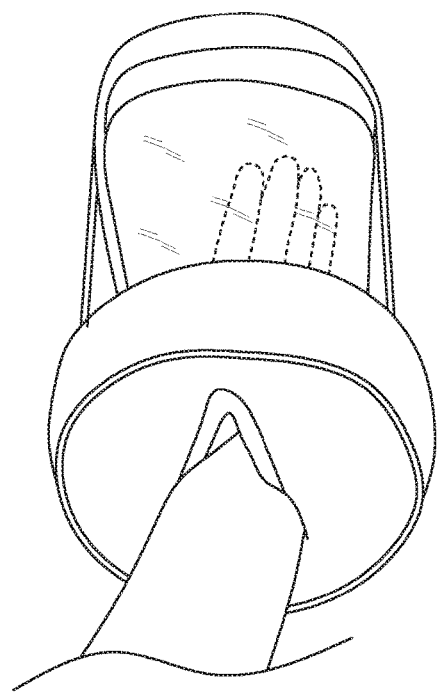
FIG. 9 Hand inserted into cavity

POSTPARTUM UTERUS MODEL

FIELD OF THE INVENTION

This invention relates to equipment for training health personnel in immediate postpartum uterus medical treatment, in order to increase the success rate for such treatment. The invention provides a model or simulator for training of immediate postpartum intrauterine device (PP IUD) insertion technique and medical interventions related to a postpartum uterus.

BACKGROUND OF THE INVENTION AND PRIOR ART

After delivery of the placenta, i.e. a child, the uterus and other genital organs return to their normal pre-pregnant stage, in a process termed involution. This process takes about 6 weeks, but only in the first hours after the delivery of the child complications may occur, in which case the uterus can stay in an atonic state. The complications typically comprise bleeding, since incorrect involution does not close blood vessels due to insufficient contraction of the uterus. Medical treatment in the first 0-48 hours after delivery is termed immediate postpartum medical treatment. A typical emergency during immediate postpartum care is atonic bleeding. Relevant interventions include bimanual compression, manual removal of placenta and insertion of balloon tamponade. PP IUD insertion, which is insertion of a so called spiral for pregnancy control, is also an intervention that takes place immediately postpartum. In countries or areas of insufficient healthcare, such as in many developing countries, immediate PP IUD may be recommended since the mother may not come to healthcare again for a long period of time. In developed countries the normal procedure is PP IUD insertion after some weeks since post controls are normal procedure.

The availability and quality of healthcare varies broadly. But even with well trained personnel and quality equipment the risk for incorrect treatment, and in worst case fatalities, is significant. This is particularly true when it comes to immediate postpartum uterus medical treatment, for which there is a lack of proper training equipment and procedures. Models for relevant training do not exist or existing models do not result in the aimed effect of the training. The existing models are in substance gynecological pelvic models, such as ZOE Gynecological Simulator, or multipareous uterus models with vaginal conduct, such as Enasco Female Pelvic Model and Ortho McNeil, or Multiparous Uterus models such as Enasco IUD trainer, S507 Uterus and S507.100 Uterus II. The current models are rigid, hollow or are only representing uterus as contracted or at certain stages during the pregnancy process. The current models provide no realistic training inside a uterus for immediate postpartum medical treatment.

The closest prior art is assumed to be described in patent publication WO 2011073407.

A demand exists for more realistic models for training of medical personnel for immediate postpartum medical treatment. The objective of the invention is to meet the demand.

SUMMARY OF THE INVENTION

The invention provides a simulator for training of personnel for immediate postpartum medical treatment, distinctive in that the simulator comprises a representation of an immediate postpartum stage uterus, a cervix, a vagina and a resilience member, the uterus is arranged at an angle to the vagina and the resilience member is arranged for allowing said angle to be straightened out by pressing horizontally forward on the uterus. By pressing horizontally forward, it is meant pressing horizontally forward from above if the simulator is arranged on a table or floor, so as to open up said angle.

In this context, the term "immediate postpartum" refers to the 24 hours immediately following the delivery of the placenta and fetus. This model comprises of anatomical features typical of this time period. The simulator comprises elements shaped, arranged and connected so as to resemble a real postpartum stage uterus, cervix and vagina. At this stage, the uterus, according to description by doctors and other medical personnel undertaking immediate postpartum medical treatment, has a gel-like texture and an undefined shape with uterine walls apposed, without a defined cavity inside when the uterus is in a natural state without intervention. The simulator resembles these features, but also the active steps required for a successful immediate postpartum spiral insertion can be simulated in a realistic way. More specifically, the features that the uterus is arranged at an angle to the vagina, with the cervix opening in between, and the resilience member is arranged for allowing said angle to be straightened out by pressing horizontally forward on the uterus, implies that the uterus is flexible and that said angle straightens or opens up toward a straight line for facilitating spiral insertion. The critical step assumed to be the most typical reason for failure in immediate postpartum spiral insertion, is that the spiral is inserted in the lower segment of the uterus. More specifically, the spiral is often positioned incorrectly in the cervix since the angle between the vagina and uterus has not been opened correctly from the typical immediate postpartum angle of about 90°. Accordingly, the simulator allows realistic training of the step that is assumed to be the most frequent source for failure for PP IUD insertion.

The simulator preferably comprises additional features, as defined in dependent claims.

Preferably, the angle between the uterus and the vagina is in the range of 80° to 120°, ideally at 90°, the angle can be increased toward 120°-180° by pressing with a hand from above on the uterus representation by a moderate force in the range 1-50 N, more preferably 2-40 N, most preferably about 20 N, the resilience or elasticity of the resilience member is chosen or adapted accordingly. Preferably, the resilience member is a spring arranged under the uterus having stiffness and length of stroke allowing said functionality. The spring may preferably comprise a flat structure under the uterus, or is arranged under a flat structure under the uterus, the spring is contracted when pressing down the uterus. However, many possible embodiments of the resilience member can be feasible, one of which is to integrate a spring action in the connection between uterus, cervix and vagina, which represents a preferable embodiment of the invention.

Preferably the uterus contains no specific cavity when in a natural state without intervention. This means that the walls thereof, such as a top and bottom layer, lay in substance together but is opened up or moving apart forming a cavity when a tool or a hand is inserted in the uterus. Preferably the uterus comprises a defined upper or inner part, an uterine fundus. The uterus fundus is the correct location of PP IUD insertion.

Preferably, the uterus comprises a transparent top or intermediate layer allowing visual observation, such as a soft polymer window or open mesh fabric, and preferably a removable or foldable non-transparent top layer over the transparent layer. The uterus preferably comprises a soft bottom layer and a soft transparent top or intermediate layer, the bottom layer is connected to the transparent layer at least at the uterine fundus (inner or top part of the uterus), at least one of the layers has a surface causing friction, such as a hairy structure, at least at the uterine fundus providing friction for hanging up a spiral by simulation of PP IUD insertion, and the layers are flexible and soft and are arranged close together, providing an undefined flexible feel and shape when inserting a hand or a tool into said uterus. The connection of the bottom layer to the top or intermediate layer, such as by folding, molding or sewing, provides a defined position of uterine fundus.

Further, the simulator preferably comprises a pelvic bone, arranged around the vagina, and a frame, arranged below the uterus representation, the frame can be set on an underlayer like a table, and a spring element arranged between the frame and the uterus representation so that the uterus representation can be pressed downward when training, for opening up the angle between the uterus and vagina for facilitating PP IUD insertion and for providing realistic flexibility of the uterus when undertaking manual manipulation training for stopping bleeding. The uterus can be more or less folded together for bimanual compression training.

The simulator is preferably adapted for being arranged to or within existing simulators, models or manikins, as a removable module for immediate postpartum medical treatment training, by having dimensions and fastening means adapted to fit to fastening means and cavities arranged in said existing simulator, model or manikin.

The invention also provides a simulator for training of personnel for immediate postpartum medical treatment, distinctive in that the simulator comprises a representation of an immediate postpartum stage uterus, a cervix and a vagina, the uterus comprises a transparent top or intermediate layer allowing visual observation, and preferably a removable or foldable non-transparent top layer over the transparent layer. Preferably, the transparent top or intermediate layer and a bottom layer of the uterus are apposed, as the layers are tight together when in a natural state without intervention, and preferably the uterus is flexible, allowing realistic manipulation for medical treatment training.

The invention also provides use of the simulator of the invention, for realistic training of immediate postpartum medical treatment.

The simulators provides realistic training of bimanual compression, for stopping bleeding in atonic state of uterus, training of realistic use of balloon tamponade for stopping bleeding or hemorrhage, training of manual removal of placenta or retained parts thereof, in addition to realistic training of PP IUD insertion, manual and instrumental.

The simulator of the invention contributes to improved health and improved family planning. The simulator can be used also for upfront agreement on PP IUD insertion in developing countries.

FIGURES

Figure 3:
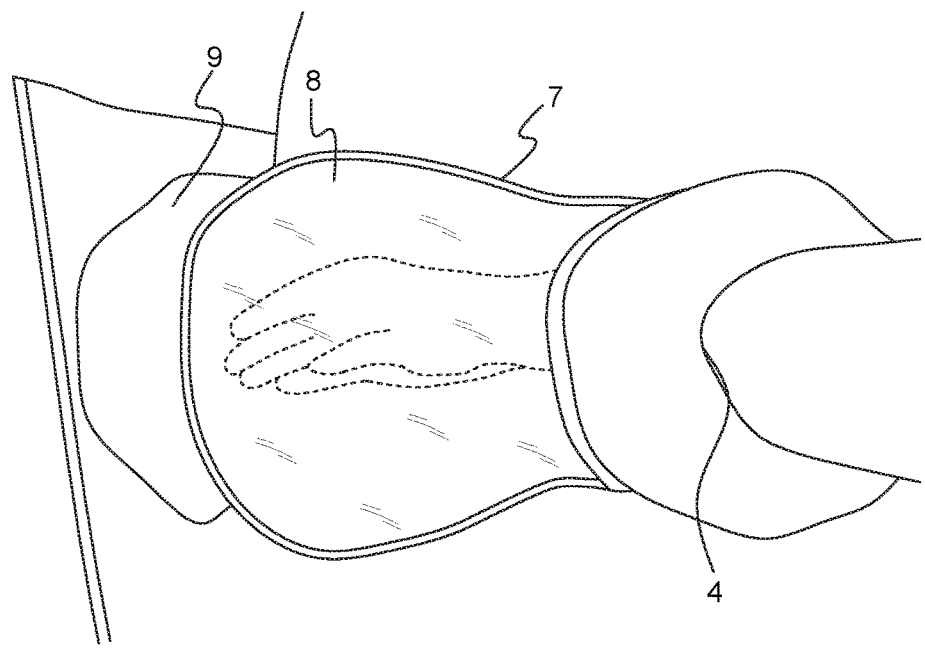
Figure 4:
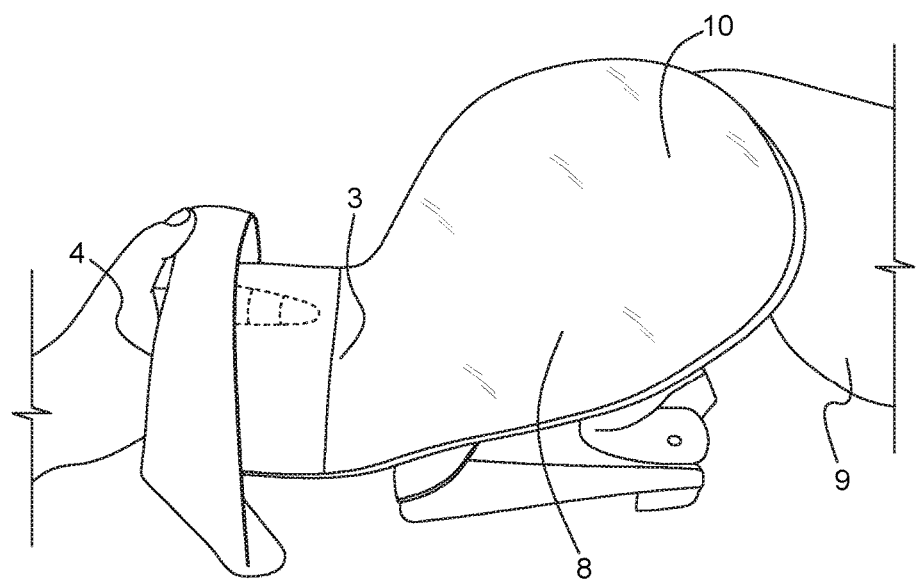
Figure 5:
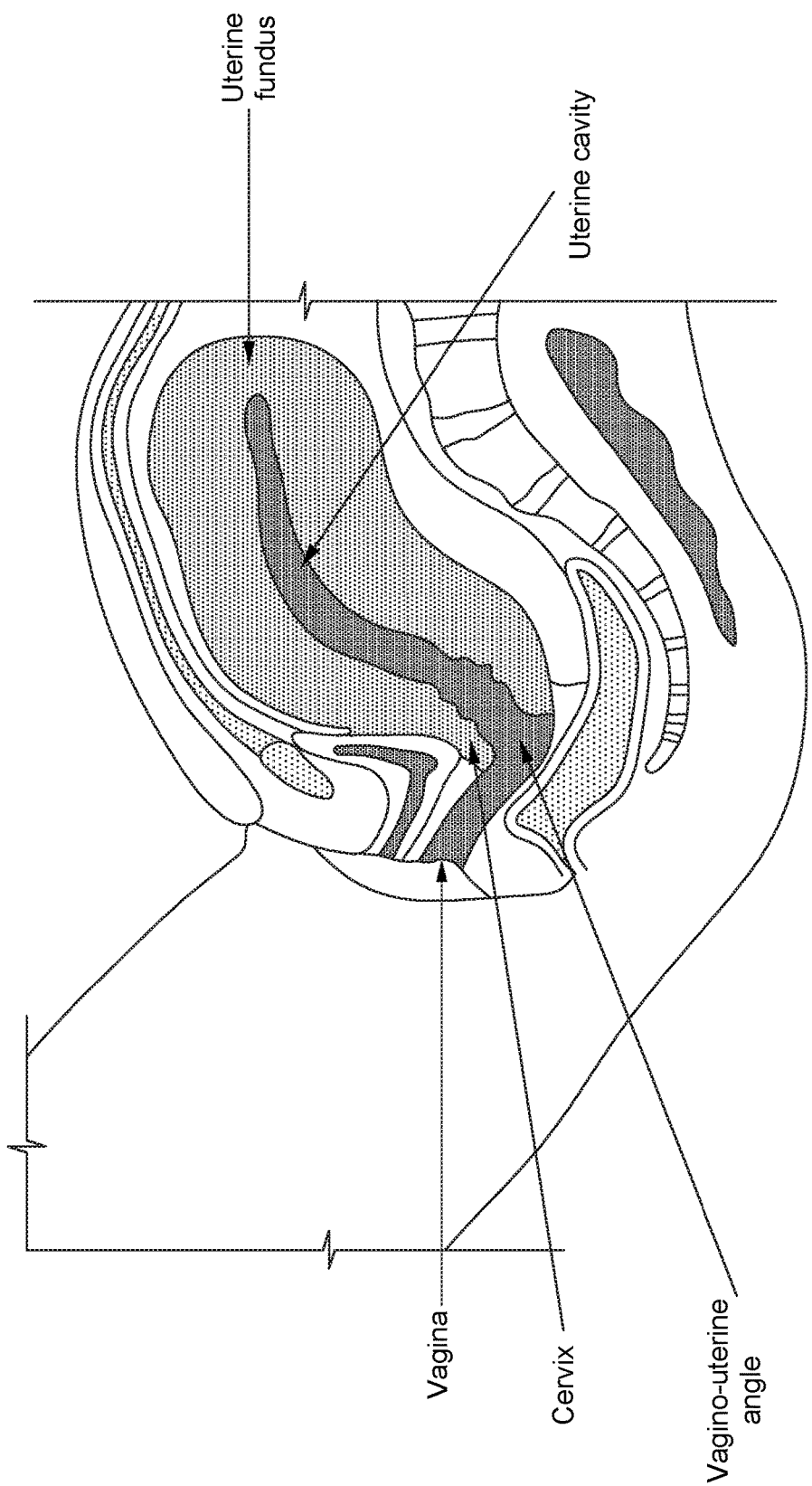

The invention is illustrated with five figures, of which:
FIGS. 1-4 illustrate an embodiment of a simulator of the invention, in various stages during training, and
FIG. 5 illustrates the anatomy of postpartum uterus.
FIGS. 6-9 illustrate another embodiment of a simulator of the invention, in different positions.

DETAILED DESCRIPTION

Reference is first made to FIG. 1-4, illustrating a simulator 1 of the invention for training of personnel for immediate postpartum medical treatment. The simulator 1 comprises a representation of an immediate postpartum stage uterus 2, a cervix 3 and a vagina 4, and a resilience member 5. The uterus is arranged at an angle to the vagina and the resilience member is arranged between the uterus 2 and a frame 6 for allowing said angle to be straightened out by pressing downward on the uterus.

The FIGS. 1-4 are photographs, not all features can be observed easily and reference numericals are not fully provided on all figures.

Figure 2:
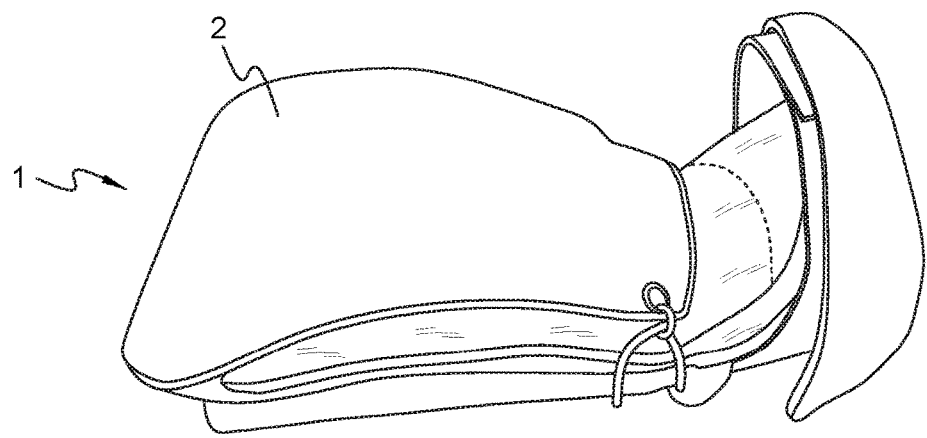

FIG. 1 shows the simulator in normal position, whilst FIG. 2 shows the simulator when the uterus 2 is pressed horizontally forward by a hand, straightening up or opening an angle between the vagina and uterus, for facilitating PP IUD insertion. FIG. 3 illustrates the simulator with a hand inserted into the uterus. A soft bottom layer 7, a transparent intermediate layer 8 and a folded back non-transparent top layer 9 can clearly be seen, the uterus cavity is opened up by the inserted hand between the soft bottom layer and the intermediate transparent layer. During normal training the non-transparent top layer 9 is arranged over the uterus in order to provide realistic training where the personnel must rely on feel and dexterity rather than vision. The top cover can be folded back or removed in order to allow observation of the uterus. In FIG. 4 a correctly inserted spiral 10 can be seen. All parts of the uterus are flexible so the uterus can be folded and manipulated during training, for example for bimanual compression training. A pelvic bone 11 is also represented in the simulator, the pelvic bone 11 and the frame 6 are preferably built as a single rigid structure or collapsible for efficient packaging.

FIG. 5 is an illustration of a typical immediate postpartum uterus. Essential in this context is the vagino-uterine angle, typically 90.degree., the angle can be opened up by manipulation as described, both for real life immediate postpartum medical treatment and when training with the simulator. The uterus is more or less without a defined cavity, resembled by the uterus of the simulator, but with a uterine fundus, also resembled by the simulator.

The simulator comprises a modeled cervix uterus and vagina, the vagina and uterus are flexibly coupled by a resilience member such as an elastic band. The postpartum uterus is modeled, having no cavity without intervention. Two layers of the uterus form an envelope. The vaginal opening preferably is elastic. The angle of incidence between uterus and the vaginal opening can be manipulated (figures illustrating this) Static angle is ~90 degrees, can be manipulated to be 180 degrees. Outer fabric layer preferably with foam, and preferably teddy material inside the uterus surface to catch the IUD, prevent it from migrating down. The can be used on a table, preferably with a tab mechanism. The mesh component or equivalent can hide the user's performance during training, then reveal result of intervention.

The simulators of the invention can comprise any features as herein described or illustrated, in any operative combination, each such operative combination is an embodiment of the present invention.

The invention claimed is:
1. A simulator for training of personnel for immediate postpartum medical treatment, the simulator comprising:
a simulated immediate postpartum stage uterus;
a simulated cervix;
a simulated vagina connected to the simulated cervix;
a spring or elastic band in contact with an underside of the uterus, wherein the spring or elastic band holds the uterus resiliently in an angle to the vagina; and
wherein said angle is increased by pressing on the uterus.

2. The simulator according to claim 1, wherein the angle between the uterus and the vagina is 90° and the angle can be increased by pressing on the uterus from above.

3. The simulator according to claim 1, wherein the angle between the uterus and the vagina can be increased to 120-180°.

4. The simulator according to claim 1, wherein the uterus contains no defined cavity when in a natural state without intervention.

5. The simulator according to claim 1, wherein the uterus comprises a defined upper or inner part to simulate a uterine fundus.

6. The simulator according to claim 1, wherein the uterus comprises a transparent top or intermediate layer allowing visual observation.

7. The simulator according to claim 1, wherein the uterus comprises a soft bottom layer and a soft transparent top or intermediate layer, wherein the bottom layer is connected to the transparent layer at least at the inner or top part of the uterus, at least one of the layers has a hairy structure, at least at a uterine fundus, and the layers are flexible and soft and are arranged close together, providing a tactile sensation when inserting a hand or a tool into said uterus.

8. The simulator according to claim 1, wherein the simulator further comprises a pelvic bone, arranged around the vagina, and a frame, arranged below the uterus, wherein the frame can be set on an underlayer, and a spring element arranged between the frame and the uterus so that the uterus can be pressed downward when training, for opening up the angle between the uterus and the vagina for facilitating immediate postpartum intrauterine device insertion and for providing realistic flexibility of the uterus when undertaking manual manipulation training for stopping bleeding.

9. The simulator according to claim 1, wherein the simulator is adapted for being arranged to or within an existing simulator, model, or manikin, as a removable module for immediate postpartum medical treatment training, by having dimensions adapted to fit to said existing simulator, model, or manikin.

10. The simulator of claim 6, wherein the transparent top or intermediate layer comprises a soft polymer window or open mesh fabric.

11. The simulator of claim 10, comprising a removable or foldable non-transparent top layer over the transparent top or intermediate layer.

12. The simulator of claim 6, comprising a removable or foldable non-transparent top layer over the transparent top or intermediate layer.

* * * * *